US010078603B2

(12) United States Patent
Tsirkin et al.

(10) Patent No.: US 10,078,603 B2
(45) Date of Patent: Sep. 18, 2018

(54) MSI EVENTS USING DYNAMIC MEMORY MONITORING

(71) Applicant: Red Hat Israel, Ltd., Raanana (IL)

(72) Inventors: Michael Tsirkin, Raanana (IL); Avi Kivity, Raanana (IL); Dor Laor, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 230 days.

(21) Appl. No.: 13/689,950

(22) Filed: Nov. 30, 2012

(65) Prior Publication Data
US 2014/0156894 A1    Jun. 5, 2014

(51) Int. Cl.
*G06F 13/24* (2006.01)
(52) U.S. Cl.
CPC .................... *G06F 13/24* (2013.01)
(58) Field of Classification Search
CPC .................................. G06F 13/24
USPC ........................ 710/260, 261, 267
See application file for complete search history.

(56) References Cited

U.S. PATENT DOCUMENTS

| 5,414,858 | A * | 5/1995 | Hoffman | G06F 13/22 |
| | | | | 340/3.4 |
| 6,192,440 | B1 | 2/2001 | Lowe et al. | |
| 6,681,281 | B1 | 1/2004 | Maleck | |
| 2003/0131173 | A1 | 7/2003 | Cassidy | |
| 2005/0138314 | A1 * | 6/2005 | Liang | G06F 12/1425 |
| | | | | 711/163 |
| 2006/0015668 | A1 | 1/2006 | Nguyen et al. | |
| 2007/0112987 | A1 * | 5/2007 | Sharma | H04L 12/437 |
| | | | | 710/261 |
| 2008/0126648 | A1 | 5/2008 | Brownlow et al. | |
| 2010/0169528 | A1 * | 7/2010 | Kumar | G06F 13/385 |
| | | | | 710/263 |
| 2010/0332693 | A1 | 12/2010 | Ben-Yehuda et al. | |
| 2011/0047309 | A1 * | 2/2011 | Brinkmann et al. | 710/261 |
| 2011/0179414 | A1 | 7/2011 | Goggin et al. | |
| 2011/0197003 | A1 * | 8/2011 | Serebrin | G06F 9/45558 |
| | | | | 710/267 |

(Continued)

OTHER PUBLICATIONS

U.S. Appl. No. 13/767,163, entitled "Direct Mapping of MSI-X Registers Using Paravirtualized Memory Monitoring", filed Feb. 14, 2013.

(Continued)

*Primary Examiner* — Tim T Vo
*Assistant Examiner* — Phong H Dang
(74) *Attorney, Agent, or Firm* — Lowenstein Sandler LLP

(57) ABSTRACT

A method and system for managing message-signaled interrupt-based events sent from an event source to a host or a guest is disclosed. A central processing unit instructs an event source to write a message-signaled interrupt to a designated address of a random access memory of the host. The host or a guest of the central processing unit executes a memory monitoring instruction to the designated address. The host or the guest enters a wait state. The host or the guest detects a write of the message-signaled interrupt by the event source to the designated address, the message-signaled interrupt comprising data items pertaining to an event to be performed. The host or the guest exits from the wait state. The host or the guest performs an atomic operation with respect to the event based on the data items in the message-signaled interrupt.

20 Claims, 5 Drawing Sheets

(56) References Cited

U.S. PATENT DOCUMENTS

| | | |
|---|---|---|
| 2011/0202699 A1 | 8/2011 | van Riel |
| 2012/0203947 A1 | 8/2012 | Tsirkin |
| 2014/0129751 A1* | 5/2014 | Cho ........................ G06F 13/24 710/260 |
| 2014/0143771 A1 | 5/2014 | Tsirkin et al. |
| 2014/0149633 A1 | 5/2014 | Tsirkin et al. |
| 2014/0149979 A1 | 5/2014 | Tsirkin et al. |
| 2014/0189182 A1* | 7/2014 | Chew ...................... G06F 13/24 710/260 |
| 2014/0229647 A1 | 8/2014 | Tsirkin et al. |

OTHER PUBLICATIONS

USPTO, Office Action for U.S. Appl. No. 13/767,163, dated Jan. 12, 2015.
USPTO, Final Office Action for U.S. Appl. No. 13/767,163, dated May 12, 2015.
USPTO, Advisory Action for U.S. Appl. No. 13/767,163, dated Jul. 29, 2015.
USPTO, Office Action for U.S. Appl. No. 13/767,163, dated Sep. 23, 2015.
USPTO, Final Office Action for U.S. Appl. No. 13/767,163, dated Apr. 4, 2016.
USPTO, Advisory Action for U.S. Appl. No. 13/767,163, dated Jun. 22, 2016.
USPTO, Office Action for U.S. Appl. No. 13/767,163, dated Dec. 21, 2016.
USPTO, Notice of Allowance for U.S. Appl. No. 13/767,163, dated Apr. 12, 2017.

* cited by examiner

MSI EVENTS USING DYNAMIC MEMORY MONITORING

TECHNICAL FIELD

Embodiments of the present disclosure relate to a computer system, and more specifically, to managing message-signaled interrupt-based events sent from an event source to a host or a guest.

BACKGROUND

In order to preserve power resources and lower overhead usage, conventional host (physical) CPUs utilize memory monitoring instructions (e.g., monitor and mwait instructions) designating a range of memory that allow the host CPU to stop instruction execution and await receipt of an event to execute. In a virtualized computing system wherein a single virtual CPU (VCPU) of a virtual machine (VM) runs on a single host CPU, the virtual machine may execute a memory monitoring instruction on the designated address range, such that a virtual CPU (VCPU) and associated host CPU are blocked from further execution and enter a wait state until there is a change to the designated memory from an event source or an inter-processor interrupt is received.

In an example, events may include interrupts. An interrupt is a signal to the CPU or VCPU or an instruction in software that a device which produced the interrupt needs immediate attention. An interrupt signals the CPU or VCPU of a high-priority condition requiring the interruption of the current code that the CPU or VCPU is executing. The CPU or VCPU typically responds by suspending its current activities, saving its state, and executing a small program called an interrupt handler (interrupt service routine, ISR) to deal with the event. This interruption is temporary, and after the interrupt handler finishes, the processor resumes execution of the previous thread.

There are two types of interrupt. A hardware interrupt is an electronic alerting signal to the CPU from an external device, either a part of the computer itself such as a disk controller or an external peripheral. For example, pressing a key on the keyboard or moving the mouse triggers hardware interrupts that cause the CPU to read the keystroke or mouse position. Unlike the software type, hardware interrupts are asynchronous and can occur in the middle of instruction execution, requiring additional care in programming. The act of initiating a hardware interrupt is referred to as an interrupt request (IRQ).

A software interrupt is usually caused either by an exceptional condition in the CPU itself, or a special instruction in the instruction set which causes an interrupt when it is executed. The former is often called a trap or exception and is used for errors or events occurring during program execution that are exceptional enough that they cannot be handled within the program itself. For example, if the processor's arithmetic logic unit is commanded to divide a number by zero, this impossible demand will cause a divide-by-zero exception, perhaps causing the CPU to abandon the calculation or display an error message.

Each interrupt typically has its own interrupt handler. The number of hardware interrupts can be limited by the number of interrupt request (IRQ) lines to the CPU, but there may be hundreds of different software interrupts.

If implemented in hardware, an interrupt controller circuit such as a Programmable Interrupt Controller (PIC) may be connected between the interrupting device and the CPU's interrupt pin to multiplex several sources of interrupt onto the one or two CPU lines typically available.

A message-signaled interrupt usually does not use a physical interrupt line. Instead, a device can signal its request for service by sending a short message over some communications medium, typically a computer bus. Rather than use a special message type reserved for interrupts, message-signaled interrupts uses a memory write message type. PCI computer buses (including serial PCI express and parallel PCI and PCI-X bus types) can use message-signaled interrupts.

PCI devices typically use special messages, called MSI or MSI-X capability structures, to allow operating system software to enable a device to assert an interrupt by means of a message-signaled interrupt. Message-signaled interrupts can allow the device to write a small amount of data to a special address in memory space (e.g., a control register of a PIC). The PIC can deliver the corresponding interrupt to a CPU.

PCI defines two optional extensions to support message-signaled interrupts, MSI and MSI-X. While PCI is software compatible with legacy interrupts, it uses MSI or MSI-X. MSI (first defined in PCI 2.2) permits a device to allocate 1, 2, 4, 8, 16 or 32 interrupts. The device is programmed with an address to write to (e.g., a control register of a PIC), and a 16-bit data word to identify it. The interrupt number is added to the data word to identify the interrupt. Some platforms such as Windows may not use 32 interrupts but rather use up to 16 interrupts.

MSI-X (first defined in PCI 3.0) permits a device to allocate up to 2048 interrupts. The address used by original MSI was found to be restrictive for some architectures. MSI-X allows a larger number of interrupts and gives each one a separate target address and data word. Devices with MSI-X may not necessarily support 2048 interrupts but typically support at least 64 which is double the maximum MSI interrupts.

DETAILED DESCRIPTION

Figure 1:
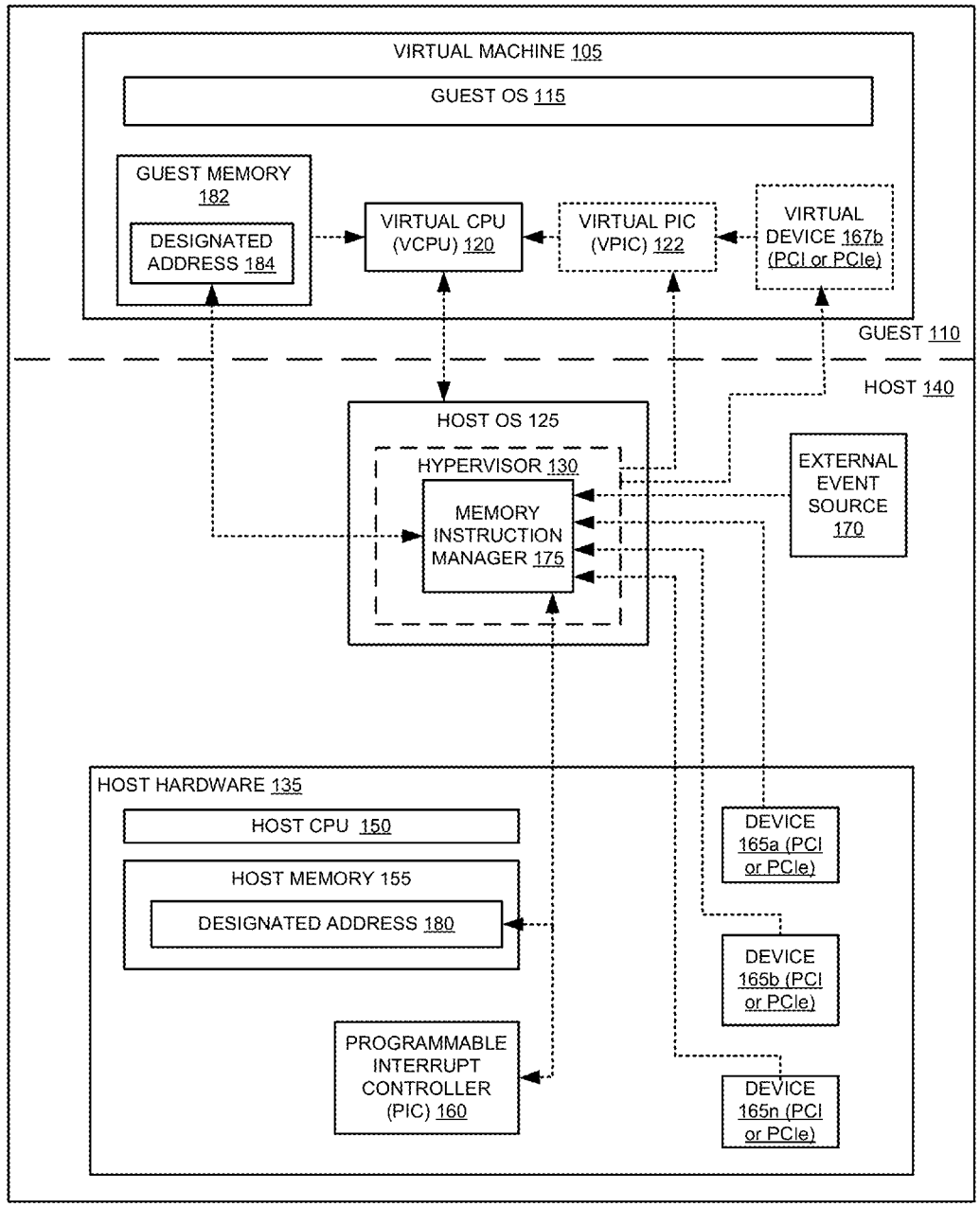
FIG. 1 is a block diagram that illustrates an example computing system 100 in which implementations of the present disclosure may operate.

Methods and systems for managing message-signaled interrupt-based events sent from an event source to a host or a guest are disclosed. A central processing unit instructs an event source to write a message-signaled interrupt to a designated address of a random access memory of the host. The host or a guest of the central processing unit executes a memory monitoring instruction to the designated address. The host or the guest enters a wait state. The host or the guest detects a write of the message-signaled interrupt by the event source to the designated address, the message-signaled interrupt comprising data items pertaining to an event to be performed. The host or the guest exits from the wait state. The host or the guest performs an atomic operation with respect to the event based on the data items in the message-signaled interrupt.

When the event source is a programmable device (e.g., a PCI device), the host or the guest may instruct the event source to write the message-signaled interrupt directly to the designated address. The host or the guest may further instruct the event source to write the message-signaled interrupt directly to the designated address prior to or following the execution of a memory instruction by the host or the guest to the designated address range. Instructing the event source to write the message-signaled interrupt directly to the designated address prior to the execution of a memory instruction may comprise preprogramming the event source to write data to the designated address range prior to instructing the host or the guest to execute a memory monitoring instruction to the designated address.

In another example, the host or the guest may detect a write by the event source to the message-signaled interrupt capability register/table of a programmable interrupt controller associated with the host, trap the message-signaled interrupt, and, map a message-signaled address in a message-signaled interrupt capability table to the designated address.

The message-signaled interrupt may be an MSI interrupt or an MSI-X interrupt. The atomic operation may comprise concurrently reading the designated address to detect the event and clearing the event. The atomic operation may be one of a compare and exchange operation or a test and clear operation (described below).

When a plurality of event sources raise corresponding events intended for processing by the host or the guest, the host or the guest selects one set of event sources for writing the message-signaled interrupt directly to the designated address using memory monitoring, and selecting a remaining set of event sources for writing the message-signaled interrupt directly to a programmable interrupt controller associated with the host or the guest.

In an example, the host or the guest may map events received from the event source to the designated address when the measured frequency of detected events from the event source is equal to or above a frequency threshold and detect events from an associated interrupt controller when the measured frequency of detected events from the event source is below the frequency threshold.

Accordingly, an efficient method and system is provided that enables an event source to send MSI-based or MSI-X-based events for performance by a host or a guest using memory monitoring instructions. Direct memory monitoring by a host or a guest avoids the computational and time expense associated with a conventional MSI interrupt (e.g., the computational/time expense associated with jumping to an interrupt vector, extra processing by an associated interrupt controller, switching from guest to host mode, etc.).

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

FIG. 1 is a block diagram that illustrates an example computing system 100 in which examples of the present disclosure may operate. The computing system 100 hosts a virtual machine (VM) 105. The virtual machine 105 runs a guest (e.g., guest 110) that uses a guest operating system 115 to manage its resources. The virtual machine 105 may run the same or different guest operating systems, such as Microsoft Windows®, Linux®, Solaris®, Mac® OS, etc. The computing system 100 may be a server, a workstation, a personal computer (PC), a mobile phone, a palm-sized computing device, a personal digital assistant (PDA), etc.

Throughout the following description, the term "guest" refers to the computer readable instructions run on the hypervisor that is installed on a disk, loaded into memory, or currently running. A guest may include one or more of the following: a firmware copy in memory, an operating system, additional installed software, a browser, applications running on the browser, etc. The term "virtual machine" (VM) refers to part of a host system that is visible to the guest. A virtual machine may include one or more of the following: memory, virtual CPU (e.g., one or more VCPUs 120), virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

In one example, the computing system 100 runs a hypervisor 130 to virtualize access to the underlying host hardware 135 of a host 140, making the use of the virtual machine 105 transparent to the guest 110 and the users of the computing system 100. In one example, the hypervisor 130 may support the virtual machine 105. In one example, the hypervisor 130 is part of a host operating system (OS) 125 of the host 140.

In one example, the computing system 100 also includes hardware components (host hardware) including a host central processing unit (CPU) 150. The computing system 100 may also include host memory 155, a programmable interrupt controller (PIC) 160, PCI based input/output (I/O) devices 165a-165n and other hardware devices 165a-165n. In one example, a VCPU 120 runs on the host CPU 150 configured to handle message-signaled interrupt (MSI or MSI-X) event notifications from one or more event sources (e.g., the PCI devices 165a-165n, respectively, and event sources 170 external to the computer system 100) in accordance with the method described in connection with FIG. 3 or 4. Example message-signaled interrupt event notifications submitted by the one or more PCI devices 165a-165n include a notification that a packet has been transmitted or received from a network interface card (NIC), a notification that a request to perform a disk I/O operation has been completed, a notification that an image has been output to a display from a video card, a notification that data was sent on a serial port from a serial card, etc. Examples of external event sources 170 include a virtual device, a hardware device, etc.

In a virtualized environment, a virtual machine may not have direct access to the PIC 160 of the host 140. Message-signaled interrupt events received from a physical device (e.g., 165a) to the guest 110 of the virtual machine 105 may be handled by the intervening hypervisor 130. The hypervisor 130 can emulate a virtual programmable interrupt controller (VPIC) 122 and a PCI-based virtual device 167b.

When the hardware device (e.g., 165b) of the host 140 writes an MSI/MSI-X message comprising an MSI/MSI-X capability table to a specified address in the PIC 160 to raise a MSI/MSI-X interrupt, the hypervisor 130 can trap the MSI/MSI-X capability table. The hypervisor 130 then forwards the MSI/MSI-X capability table to a specified address in the VPIC 122, which is then handled by the VCPU 120 of the guest 110. In another example, the hardware device (e.g., 165*b*) can write the message directly to a specified address in the VPIC 122.

Figure 2:
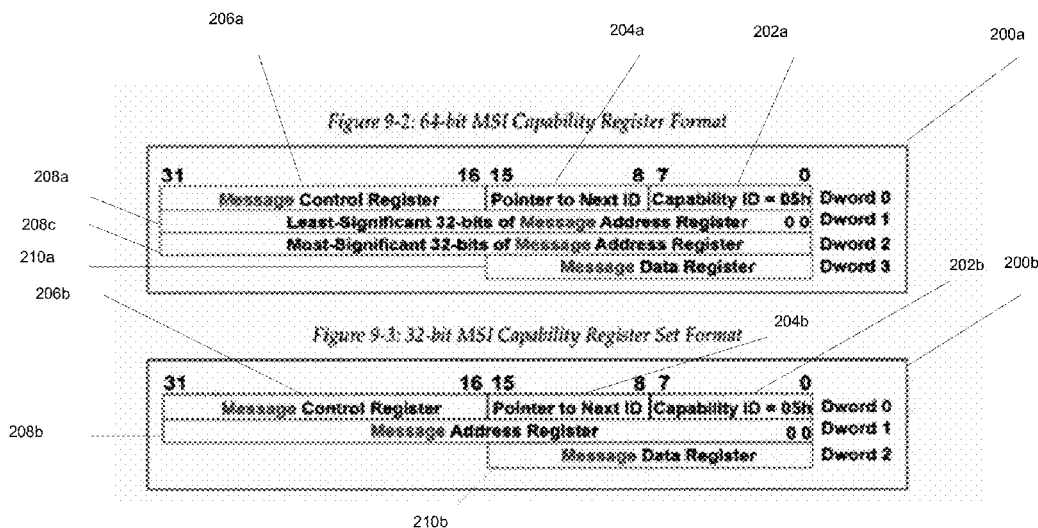
FIG. 2 shows example formats of message-signaled interrupt capability tables corresponding to MSI-X and MSI interrupt messages raisable by PCI devices.

FIG. 2 shows example formats of message-signaled interrupt capability tables associated with MSI-X (400*a*) and MSI (400*b*) interrupt messages raisable by PCI devices, respectively. Message-signaled interrupts (MSIs) can be delivered to the PIC 160/VPIC 122 through memory write transactions. The MSI address range of the PIC 160/VPIC 122 can be written by the PCI device (e.g., 165*b*) with an MSI/MSI-X message corresponding to the raised event. The information contained in the MSI/MSI-X message can include a target memory address and the data values to be written to the target memory address.

For a PCI device, the fields of the message-signaled interrupt capability registers 200*a*, 200*b* comprise a capability ID field 202*a*, 202*b* that identifies an MSI/MSI-X capable PCI device (e.g., 165*b*), and is always set to 05 hex for MSI and 11 hex for MSI-X, respectively; a pointer to the next capability (e.g. a capability unrelated to the MSI functionality) in the capability list 204*a*, 204*b*; a message control register 206*a*, 206*b* which comprises an MSI enable bit for masking/enabling/disabling the raising of MSI/MSI-X messages and fields for indicating whether the device (e.g., 165*b*) is multiple message capable/enabled and/or 64 bit address capable; a message address register 208*a* (and 208*b* for 64 bit message enabled devices) operable to contain the address of the memory write of the PIC 160/VPIC 122 used when a device (e.g., 165*b*) delivers an interrupt request to the PIC 160/VPIC 122; and a message data register 210*a*, 210*b* to contain data identifying a specific interrupt type.

At boot time, configuration software of the host 140 (or of the hypervisor 130 or the guest 110) can detect and program each PCI-capable device (e.g. 165*b*) (or emulate a virtual device, e.g., 167*b*) using an MSI/MSI-X table. The configuration software scans the PCI bus(es) and discovers devices. When a PCI express device is discovered, the configuration software reads the capability list pointer 204*a*, 204*b* to obtain the location of the first capability register within a chain of registers. The software searches the capability register sets until it discovers an MSI/MSI-X capability register set (Capability ID of 05 hex/11 hex, respectively). If an MSI capability is utilized, the configuration software then assigns a memory address to the device's message address register 208*a*, 208*b*. If the MSI-X capability is used, it is programmed in a similar way using the on-device MSI-X capability and MSI-X table structure (not shown). The configuration software then allocates a number of messages equal to or less than what the device supports (one or more messages). The configuration software writes a base message data patterns into the device's message data register 210*a*, 210*b*. Finally, the configuration software sets the MSI enable bit in the devices message control register 206*a*, 206*b*, thereby enabling the device to generate interrupts using MSI memory writes.

In an example, the hypervisor 130 includes a memory instruction manager 175 configured to place the host CPU 150 upon which the VCPU 120 is running into the memory monitoring mode, such that the execution of a memory monitoring instruction by the VCPU 120 does not result in a VM exit or transition of control to the hypervisor 130. For example, the hypervisor 130 may use a bitmap configured to manage which instructions cause the VM 105 to exit and switch to hypervisor mode, and set the bitmap such that the execution of the memory monitoring instruction by the VCPU 120 does not trigger the VM exit.

In an example, for PCI-based event sources 165*a*-165*n*, 170 capable of being programmed, the memory instruction manager 175 instructs the event source 165*a*-165*n*, 170 to write a message-signaled interrupt to a designated address 184 in the guest memory 182 of the guest 110 in order to wake up the VCPU 120 of the VM 105 for performance of the event. It is noted that the memory designation instruction may be provided by the hypervisor 130 to the event source 165*a*-165*n*, 170 either prior to or following the execution of a memory instruction (e.g., a wait instruction) by the VCPU 120 on the designated address 184. In an example, the memory instruction manager 175 is also configured to notify the VCPU 120 to execute a memory monitoring instruction to the designated address 184 and await receipt of the event from the event source 165*a*-165*n*, 170. In an example, the notification provided to the VM 105 instructs the VM 105 that a write to the designated address 184 may be used to wake up the host CPU 150, without causing an exit to the hypervisor 130. In an example, after receiving the event, the hypervisor 130 instructs the VCPU 120 to perform an atomic operation with respect to the event based on the data items in the message-signaled interrupt capability table in response to the write of data to the designated address 184 associated with an event source 165*a*-165*n*, 170. The atomic operation comprises concurrently reading the designated address to detect the event and clearing the event. The atomic operation may be one of a compare and exchange operation or a test and clear operation. A compare and exchange operation or a test and clear operation are variations of an atomic operation used in multithreading to achieve synchronization. These operations compare the contents of a memory location to a given value and, only if they are the same, modify the contents of that memory location to a given new value. The atomicity guarantees that the new value is calculated based on up-to-date information; if the value had been updated by another thread in the meantime, the write would fail. The result of the operation indicates whether it performed the substitution; this can be effected either with a simple Boolean response (this variant is often called compare-and-set), or by returning the value read from the memory location (not the value written to it.

The hypervisor 130 may instruct the event source or the event source may be preprogrammed to write data to the designated address 184 (e.g., modify the designated memory) in order to send a request for the performance of an event or action (e.g., the sending of a network packet) by the VCPU 120 of the VM 105. The data written to the designated address by the event source may comprise an MSI interrupt or an MSI-X interrupt. Accordingly, there is no need for emulating either the virtual device 167*b* or the VPIC 122, thereby saving on service interrupt overhead.

This programming does not have to be applied to all MSI-X devices universally. For example, if a device is not currently programmed to write directly to memory, then the hypervisor 130 may map the MSI or MSI-X interrupt written to a control register of an interrupt controller 160 by the event source to the VPIC 122 of the respective guest 110. The hypervisor 130 may detect a write by the event source of the message-signaled interrupt to the PIC 160 associated with the host 140. The hypervisor 130 may then trap or otherwise intercept the message-signaled interrupt, and then map the message-signaled interrupt to the VPIC 122 of the guest 110.

In an example, the memory instruction manager 175 is configured to manage the memory range designations and assignments. In this example, the memory instruction manager 175 may reserve different memory ranges for different types of event sources (e.g., a hardware device, a virtual device, etc.). For example, a first designated address range may be dedicated for use of a device 165a (e.g., a video card), a second designated address range may be dedicated for use of a device 165b (e.g., a NIC), etc.

In an example, the host memory 155 and/or the guest memory 182 may include a portion which is protected and not writeable by the devices 165a-165n. In an example, the protected portion may be writeable by an external event source 170 (e.g., a second host CPU) in order for the second host CPU to wake up the VM 105 to receive and handle a requested event.

Advantageously, the delivery of events from the event sources 165a-165n, 170 to the VM 105 using memory monitoring instructions, without causing an exit to the hypervisor 130, results in the avoidance of the trapping of instructions by the hypervisor 130 and the reduction in the computational and time expenses associated with the jumping to an interrupt vector associated with a conventional interrupt of a physical CPU.

Figure 3:
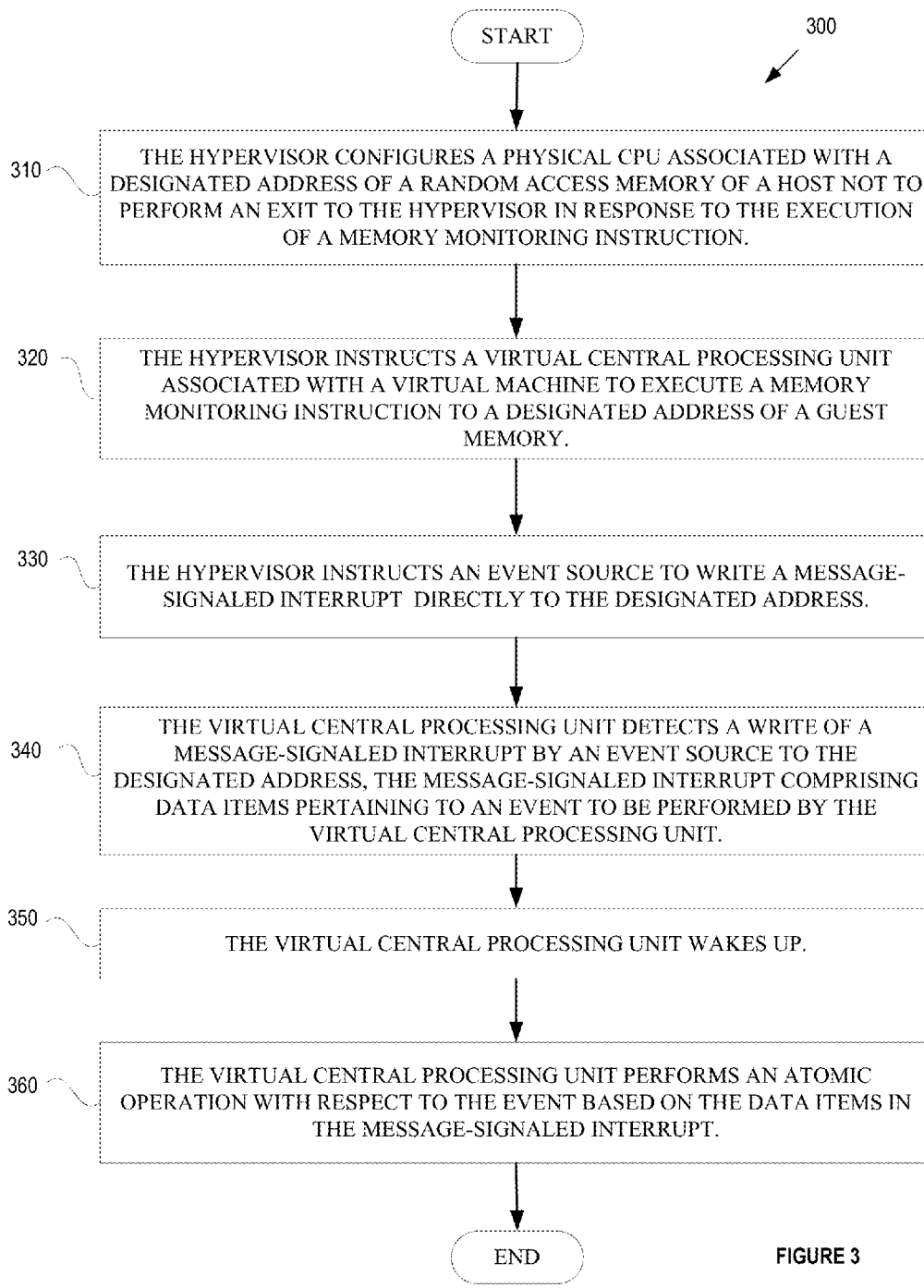
FIG. 3 is a flow diagram of an example method for managing message-signaled interrupt-based events sent from an event source to a virtual machine (VM).

FIG. 3 is a flow diagram illustrating an example of a method 300 for managing message-signaled interrupt-based events sent from an event source to a virtual machine (VM). The method 300 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 300 is performed by the memory instruction manager 175 of the hypervisor 130 of FIG. 1.

As shown in FIG. 3, in block 310, the hypervisor 130 configures the host physical CPU (e.g., host CPU 150 of FIG. 1) associated with a designated address of random access memory of the host 140 (e.g., corresponding to the designated address 184 of the guest memory 182 of FIG. 1) not to perform an exit to the hypervisor 130 in response to the execution of a memory monitoring instruction. In an example, this places the destination VCPU (e.g., VCPU 120 of the VM 105 in FIG. 1) running on the host CPU 150 into the memory monitoring mode.

In block 320, the hypervisor 130 instructs the VCPU 120 of the VM 105 to execute a memory monitoring instruction to the designated address 184 of the guest memory 182. In one example, the VCPU 120 executes a memory monitoring instruction (e.g., a monitor instruction or an mwait instruction) on the designated address 184 and enters a wait state, i.e., the physical CPU 150 executing the monitoring instruction is blocked from further execution and enters a wait state until there is a change to the memory corresponding to the designated address 184 by another physical CPU, a PCI device (e.g., 165b), or an inter-processor interrupt is received.

In block 330, the hypervisor 130 instructs the event source (e.g., device 165b) to write a message-signaled interrupt directly to the designated address 184 (e.g., modify the memory) to wake up the VCPU 120 and deliver an event (e.g., an MSI/MSI-X event) to the VM 105, without an exit to the hypervisor 130. In addition, prior to the execution of method 200, the hypervisor (e.g., hypervisor 130 of FIG. 1) may provide a notification to the VCPU 120 of the VM 105 identifying an address (e.g., the designated address 184) that may be written to by the hypervisor 130 in order to deliver an event to the VCPU 120. It is noted that the aforementioned setup steps may be performed in any order, e.g., the memory monitoring instruction may be executed before the hypervisor 130 provides the notification to the VCPU 120, or vice versa.

In block 340, the VCPU 120 detects a write of a message-signaled interrupt by the event source (e.g., device 165b), the message-signaled interrupt capability table comprising data items pertaining to an event (e.g., an MSI/MSI-X) to be performed by the VCPU 120. In an example, the data written to the designated address 184 includes information defining the specific event that is to be executed. In an example, the write of data to the designated address 184 by the event source (e.g., the device 165a) comprises writing a message-signaled interrupt (MSI) or an extended message-signaled interrupt (MSI-X) to the designated address 184. The (e.g., the PCI device 165a) event source may write the interrupt directly to the designated address 184 of the guest memory 182.

In an example, the designated address 184 may include a portion that is protected and not writeable by the devices 165a-165n, but is writeable by other event sources 170. Optionally, the protected portion of the designated address 184 may be reserved for use by another VCPU, another host CPU, or an external hardware device. In an example, the hypervisor 130 maintains an assignment of a plurality of additional address ranges associated with the VCPU 120, where each of the plurality of additional address ranges is dedicated for writing to by a specific source type.

In an example, an external event source 170 may be configured to maintain an association between the designated address 184 and the VCPU 120 to enable the external event source 170 to manage event delivery and track the manner in which the memory location associated with the VCPU 120 may be modified in the virtual mode in order to deliver an event for execution. In an example, the external event source 170 may store the association between the designated address 184 and the VCPU 120 in a memory associated with the external event source 170.

In block 350, the VCPU 120 wakes up (e.g., exits a wait state). In block 360, the VCPU 120 performs an atomic operation with respect to the event based on the data items in the message-signaled interrupt (e.g., 165a). In an example, the VCPU 120 reads the data (e.g., corresponding to the message data register 210a, 210b of an MSI/MSI-X capability register) that is written to the designated address 184 to identify what action the VCPU 120 is being asked to perform. In one example, the VCPU 120 may perform an atomic operation to read the designated address 184 to detect the event and clear the event. In an example, the atomic operation comprises performing a compare and exchange operation on the designated address 184 or a test and clear operation on the designated address 184. A test and clear operation comprises the clearing of one or more designated bits in the designated address 184 and returning the one or more bits' prior value. In an example, the VCPU 120 may read designated bits of designated address 184 to detect the event and clear the event only if the designated bits are set. A compare and exchange operation compares the contents of a memory location to a given value and, only if they are the same, modifies the contents of that memory location to a given new value.

Figure 4:
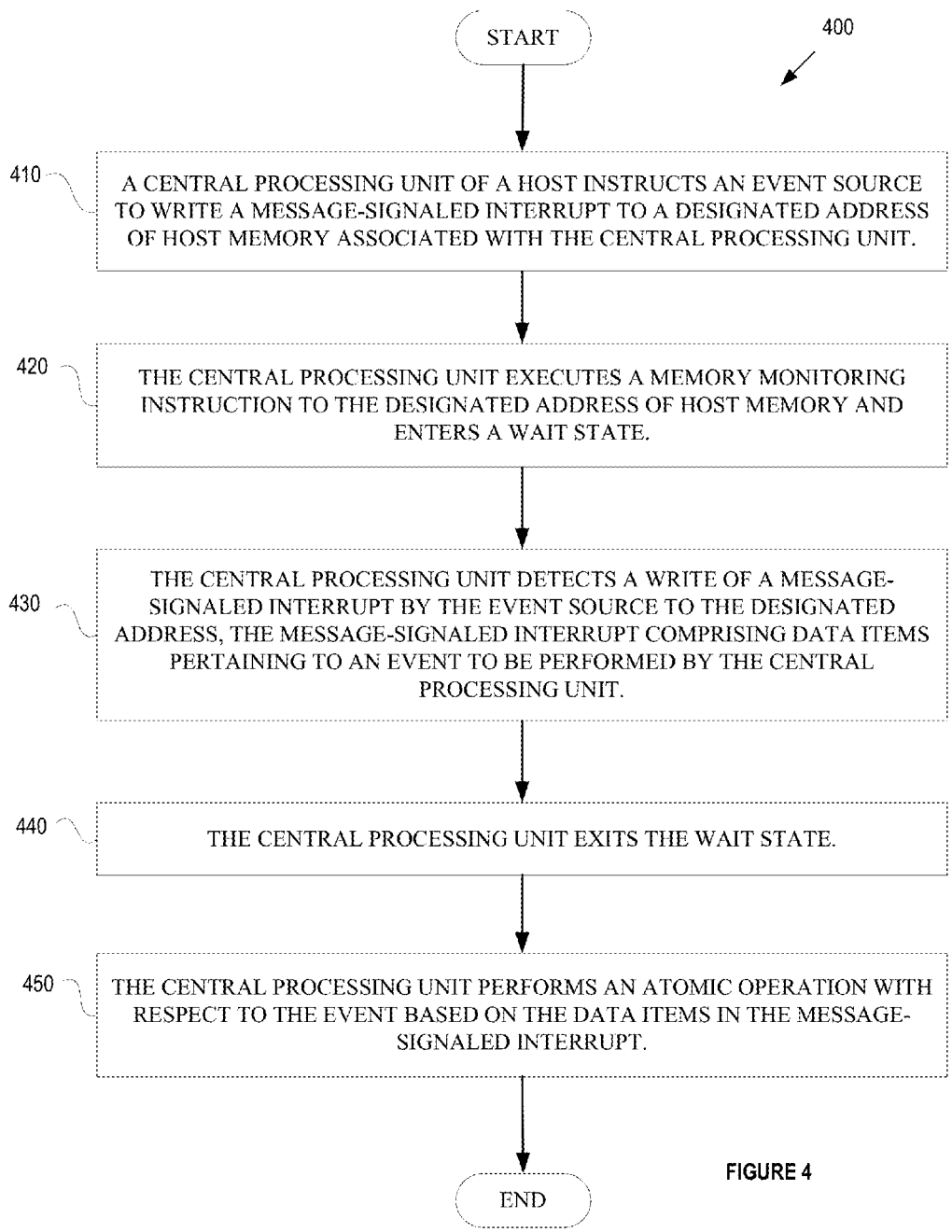
FIG. 4 is a flow diagram of an example method for managing message-signaled interrupt-based events sent from an event source to a physical central processing unit of a host.

FIG. 4 is a flow diagram illustrating an example of a method 400 for managing message-signaled interrupt-based events sent from an event source to a physical central processing unit of a host. The method 400 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 400 is performed by the memory instruction manager 175 of the host 140 of FIG. 1.

As shown in FIG. 4, in block 410, a host CPU (e.g., host CPU 150 of FIG. 1) instructs an event source (e.g., the device 165*b*) to write a message-signaled interrupt to a random access memory of the host 140 (e.g., the designated address 180 of the host memory 155 of FIG. 1). In block 420, the host CPU 150 executes a memory monitoring instruction to the designated address 180 of the host memory 155 and enters a wait state. In one example, the host CPU 150 executes a memory monitoring instruction (e.g., a monitor instruction or an mwait instruction) on the designated address 180 and enters a wait state, i.e., the host CPU 150 executing the monitoring instruction is blocked from further execution and enters the wait state until there is a change to the designated address 180 by another physical CPU, a PCI device (e.g., 165*b*), or an inter-processor interrupt is received.

In block 430, the CPU 150 detects a write of a message-signaled interrupt by the event source (e.g., device 165*b*) to the designated address 180 of the host memory 155, the message-signaled interrupt comprising data items pertaining to an event (e.g., an MSI/MSI-X interrupt) to be performed by the host CPU 150. In an example, the data written to the designated address 180 includes information defining the specific event that is to be executed. In an example, the write of data to the designated address 180 by the event source (e.g., the device 165*a*) comprises writing the data value of a message-signaled interrupt (MSI) or an extended message-signaled interrupt (MSI-X) vector to the designated vector address 180.

In an example, the designated address 180 may include a portion that is protected and not writeable by the devices 165*a*-165*n*, but is writeable by other event sources 170. Optionally, the protected portion of the designated address 180 may be reserved for use by a VCPU, another host CPU, or an external hardware device. In an example, the host CPU 150 maintains an assignment of a plurality of additional address ranges associated with the host CPU 150, where each of the plurality of additional address ranges is dedicated for writing to by a specific source type.

In an example, an external event source 170 may be configured to maintain an association between the designated address 180 and the host CPU 150 to enable the external event source 170 to manage event delivery and track the manner in which the memory location associated with a host CPU 150 may be modified in order to deliver an event for execution. In an example, the external event source 170 may store the association between the designated address 180 and the host CPU 150 in a memory associated with the external event source 170.

In block 440, the host CPU 150 exits the wait state. In block 450, the host CPU 150 performs an atomic operation with respect to the event based on the data items in the message-signaled interrupt (e.g., 165*a*). In an example, the host CPU 150 reads the data (e.g., corresponding to the message data register 210*a*, 210*b* of an MSI/MSI-X capability register) that is written to the designated address 180 to identify what action the host CPU 150 is being asked to perform. In one example, the host CPU 150 may perform an atomic operation to read the designated address 180 to detect the event and clear the event. In an example, the atomic operation comprises performing a compare and exchange operation on the designated address 180 or a test and clear operation on the designated address 180.

In an example, when a plurality of event sources (e.g., 165*a*-165*n*) raise corresponding events intended for processing by the VCPU 120 (or the CPU 150), the hypervisor 130 (or the CPU 150) may select one set of event sources (e.g., 165*a*-165*c*) for writing the message-signaled interrupt to the designated address 184, 180 using memory monitoring and select a remaining set of event sources (165*d*-165*n*) for writing the message-signaled interrupt capability table directly to a programmable interrupt controller (PIC) 160 associated with the host CPU 150. In one example, the selection may be based on measuring, by the hypervisor 130 (or the CPU 150), a frequency of detected events from the event source 165*a*-165*n*, 170.

In the virtual environment of FIG. 3, when the measured frequency of detected events from the event source (e.g., 165*a*) is equal to or above a frequency threshold, the hypervisor 130 may map events received from the event source (e.g., 165*a*) directly to the designated address 184 using memory monitoring as described in FIG. 3. If, instead, the measured frequency of detected events from the event source (e.g., 165*a*) is below the frequency threshold, the hypervisor 130 may detect events associated with the event source (e.g., 165*a*) from the interrupt controller 160, trap the events, and map them to the designated address 184 using memory monitoring. In an example, the measured frequency for an event source (e.g., 165*a*) may be determined by counting the number of events originating from that event source (e.g., 165*a*) intended for the VCPU 120 over a period of time. In an example, the period of time may be any suitable amount of time, such as for, example, a one second time frame.

In the host CPU environment of FIG. 4, when the measured frequency of detected events from the event source (e.g., 165*a*) is equal to or above a frequency threshold, the host CPU 150 may map events received from the event source (e.g., 165*a*) directly to the designated address 180 using memory monitoring as described in FIG. 4. If, instead, the measured frequency of detected events from the event source (e.g., 165*a*) is below the frequency threshold, the host CPU 150 may detect events associated with the event source (e.g., 165*a*) from the interrupt controller 160. In an example, the measured frequency for an event source (e.g., 165*a*) may be determined by counting the number of events originating from that event source (e.g., 165*a*) intended for the host CPU 150 over a period of time. In an example, the period of time may be any suitable amount of time, such as for, example, a one second time frame.

Figure 5:
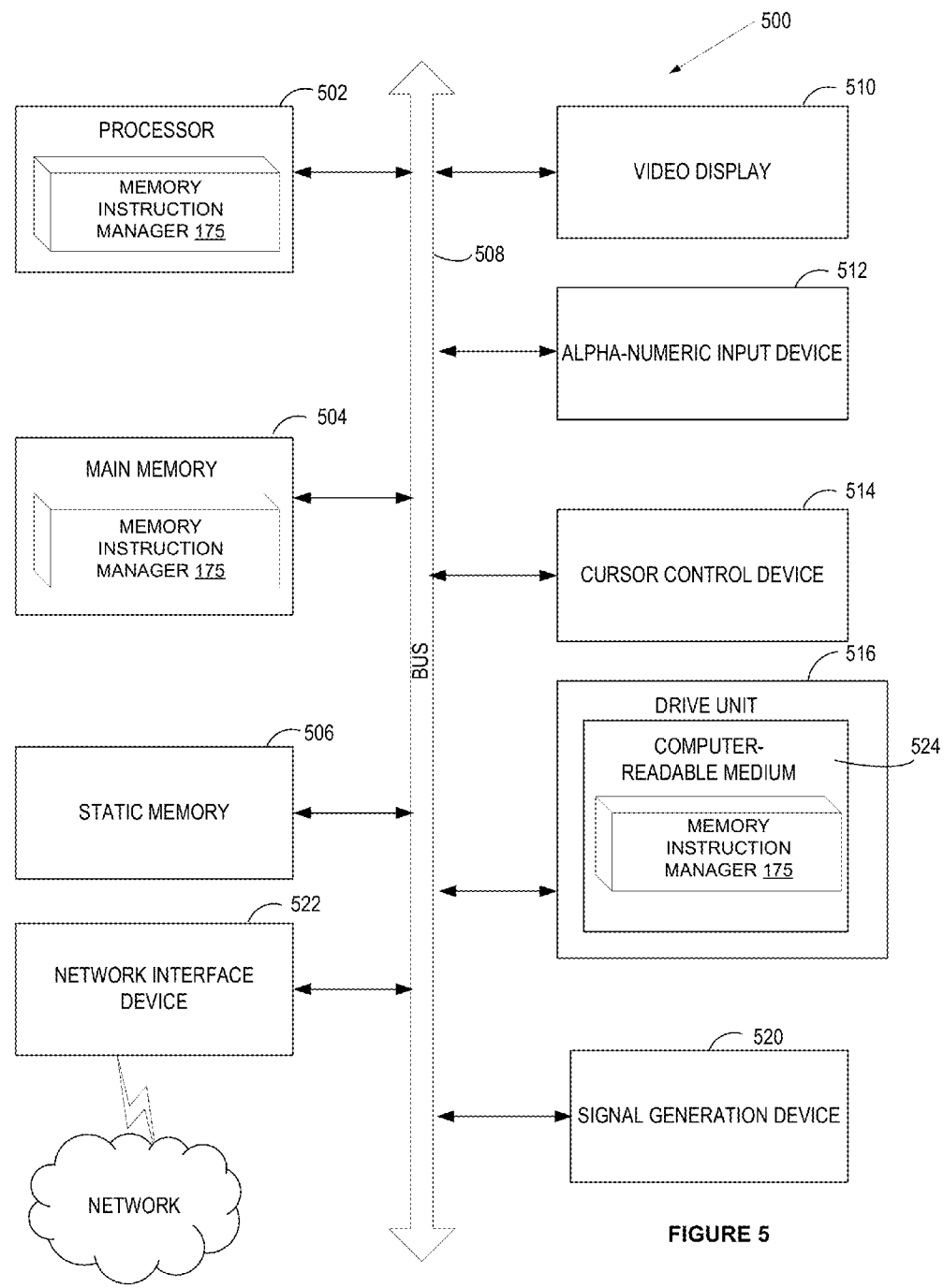
FIG. 5 illustrates a diagrammatic representation of a machine in the example form of a computer system within which a set of instructions, for causing the machine to perform any one or more of the methodologies discussed herein, may be executed.

FIG. 5 illustrates a diagrammatic representation of a machine in the example form of a computer system 500 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The memory instruction manager 175 shown in FIG. 1 may be executed by processor 502 configured to perform the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

A drive unit 516 may include a computer-readable medium 524 on which is stored one or more sets of instructions (e.g., instructions of the memory instruction manager 175) embodying any one or more of the methodologies or functions described herein. The instructions of the memory instruction manager 175 may also reside, completely or at least partially, within the main memory 504 and/or within the processor 502 during execution thereof by the computer system 500, the main memory 504 and the processor 502 also constituting computer-readable media. The instructions of the memory instruction manager 175 may further be transmitted or received over a network via the network interface device 522.

While the computer-readable storage medium 524 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    instructing, by a central processing unit, an event source of a set of event sources to write a message-signaled interrupt to a designated address of a random access memory of a host, wherein the set of event sources is selected from a plurality of event sources raising corresponding events for writing message-signaled interrupts to the designated address in view of counting a number of events originating from each of the plurality of event sources, and wherein a remaining set of event sources of the plurality of event sources is selected for writing a message-signaled table to a programmable interrupt controller associated with the host;

executing a memory monitoring instruction to the designated address of the random access memory of the host;

entering a wait state; and detecting a write of the message-signaled interrupt by the event source directly to the designated address, the message-signaled interrupt comprising data items pertaining to an event to be performed.

2. The method of claim 1, further comprising:

exiting from the wait state; and performing an atomic operation with respect to the event in view of the data items in the message-signaled interrupt.

3. The method of claim 2, wherein the memory monitoring instruction is by a guest associated with the host.

4. The method of claim 2, wherein the memory monitoring instruction is by the host.

5. The method of claim 1, wherein the designated address is in guest memory.

6. The method of claim 1, wherein the designated address is in host memory.

7. The method of claim 2, wherein instructing the event source to write the message-signaled interrupt to the designated address occurs prior to or following the execution of the memory monitoring to the designated address.

8. The method of claim 1, wherein the message-signaled interrupt is an MSI interrupt or an MSI-X interrupt.

9. The method of claim 2, wherein the atomic operation comprises concurrently reading the designated address to detect the event and clearing the event.

10. The method of claim 9, wherein the atomic operation is one of a compare and exchange operation or a test and clear operation.

11. The method of claim 1, wherein the selecting of the sets is in view of measuring a frequency of detected events from each of the plurality of event sources in view of counting a number of events originating from each of the plurality of event sources over a given period of time.

12. The method of claim 11, further comprising:

mapping events received from the event source to the designated address in response to the measured frequency of detected events from the event source is equal to or above a frequency threshold; and detecting events from an associated interrupt controller in response to the measured frequency of detected events from the event source is below the frequency threshold.

13. The method of claim 1, wherein the event source is a hardware device of a host or a virtual device of a guest.

14. The method of claim 1, wherein the event source is a PCI-based device.

15. A non-transitory computer readable storage medium comprising instructions that, when executed, cause a central processing unit to:

instruct, by the central processing unit, an event source of a set of event sources to write a message-signaled interrupt to a designated address of a random access memory of a host, wherein the set of event sources is selected from a plurality of event sources raising corresponding events for writing message-signaled interrupts to the designated address in view of counting a number of events originating from each of the plurality of event sources, and wherein a remaining set of event sources of the plurality of event sources is selected for writing a message-signaled table to a programmable interrupt controller associated with the host;

execute a memory monitoring instruction to the designated address of the random access memory of the host;

enter a wait state; and detect a write of the message-signaled interrupt by the event source directly to the designated address, the message-signaled interrupt comprising data items pertaining to an event to be performed.

16. The non-transitory computer readable storage medium of claim 15, wherein the central processing unit is further to:

exit from the wait state; and perform an atomic operation with respect to the event in view of the data items in the message-signaled interrupt.

17. A computer system comprising:

a memory;

a central processing unit, operatively coupled to the memory, the central processing unit to:

instruct an event source of a set of event sources to write a message-signaled interrupt to a designated address of a random access memory of a host, wherein the set of event sources is selected for writing message-signaled interrupts to the designated address in view of counting a number of events originating from each of the plurality of event sources, and wherein a remaining set of event sources of the plurality of event sources is selected for writing a message-signaled table to a programmable interrupt controller associated with the host; and execute a memory monitoring instruction to the designated address of the random access memory of the host;

enter a wait state;

detect a write of the message-signaled interrupt by the event source directly to the designated address, the message-signaled interrupt comprising data items pertaining to an event to be performed.

18. The system of claim 17, wherein the central processing unit further to:

exit from the wait state; and perform an atomic operation with respect to the event in view of the data items in the message-signaled interrupt.

19. The non-transitory computer readable storage medium of claim 15, wherein the selecting of the sets is in view of measuring a frequency of detected events from each of the plurality of event sources in view of counting a number of events originating from each of the plurality of event sources over a given period of time.

20. The system of claim 17, wherein the selecting of the sets is in view of measuring a frequency of detected events from each of the plurality of event sources in view of counting a number of events originating from each of the plurality of event sources over a given period of time.

* * * * *